Aug. 4, 1959 D. RICHMAN 2,898,397

COLOR-TELEVISION SYSTEM

Filed Feb. 24, 1956 5 Sheets-Sheet 1

Aug. 4, 1959

D. RICHMAN 2,898,397

COLOR-TELEVISION SYSTEM

Filed Feb. 24, 1956

5 Sheets-Sheet 3

VECTOR DIAGRAM FOR SSB I COMPONENTS

VECTOR DIAGRAM FOR SSB Q COMPONENTS 2,898,397

COLOR-TELEVISION SYSTEM

Donald Richman, Fresh Meadows, N.Y., assignor to Hazeltine Research, Inc., Chicago, Ill., a corporation of Illinois Application February 24, 1956, Serial No. 567,503

6 Claims. (Cl. 178—5.2)

*General*

This invention relates to color-television systems and, particularly, but not exclusively, to color-television systems of the type presently approved by the Federal Communications Commission for use in the United States.

In a color-television system of the type approved by the Federal Communications Commission, the major part of the luminance information of an image is conveyed by way of a monochrome signal while the additional information necessary to produce a colored picture is conveyed by way of an auxiliary color subcarrier signal which is transmitted in a frequency-interleaved manner with respect to the monochrome signal. The color subcarrier signal comprises a wide band I′ color-difference signal and a narrow band Q′ color-difference signal which are individually encoded onto a pair of carrier signals at the subcarrier frequency and which are in phase quadrature with one another, the encoded phase-quadrature subcarriers being combined to form the composite color subcarrier signal. In order to fit within the allocated band width, a portion of the color subcarrier signal is transmitted in a single side-band manner.

The form of monochrome signal presently authorized by the Federal Communications Commission falls short of the ideal sought in that not all of the luminance information of the image is conveyed by the monochrome signal, that portion which is not conveyed by the monocrome signal being conveyed or carried by the color subcarrier signal. This results primarily from the necessity of gamma-correcting the signals at the transmitter and causes a loss in luminance detail or resolution in the reproduced image because of the limited band widths of the circuits which translate the subcarrier signal and decoded color-difference signals. In other words, some of the luminance information is conveyed by the subcarrier signal and the high-frequency portion of this is lost due to the limited band width of the subcarrier signal circuits. It has been previously proposed to compensate for this loss of luminance information by a different encoding of the high-frequency portion of the monochrome signal. This proposal has the disadvantage that it tends to cause an improper picture to be reproduced on monochrome receivers. It is desirable, therefore, to have a color-television system wherein such loss of luminance resolution is minimized while, at the same time, transmitting a signal which is compatible with monochrome receivers.

There is considerable evidence that for image components of intermediate detail or intermediate degree of fineness, color vision is largely a two-color process in which case it has been thought necessary to transmit only the luminance information and one additional coordinate of color information concerning the image. The narrow band Q′ and wide band I′ encoding of the subcarrier signal presently used was determined by finding experimentally the constant direction in the subcarrier plane for the wide band axis of a pair of perpendicular axes which appeared to make the resultant images most pleasing. The basic assumption was that one coordinate, namely, the Q′ modulation components, of the subcarrier signal is essentially invisible and, hence, not needed for the range of frequencies which is transmitted in a single side-band manner. This assumption, however, does not appear to be entirely correct as is indicated by the fact that it is necessary to suppress the single side-band components in the narrow band Q′ channel of the receiver. If these high-frequency single side-band Q′ components were not actually visible, it would not be necessary to reject them. It has been found, however, that such single side-band components in the Q′ receiver channel are not invisible and often produce significant amounts of visible luminance. Accordingly, it would be desirable to utilize this additional information instead of rejecting it as such rejection tends to reduce the resolution of the reproduced image.

As mentioned, in order to fit within the allocated band width, it is necessary that part of the color subcarrier signal be translated in a single sideband manner or, more particularly, that a part of the wide band I′ color-difference signal be transmitted in a single side-band manner. Such single side-band transmission produces the possibility of signal cross talk in the subcarrier signal circuits in the receiver. In particular, such single side-band transmission can cause a portion of the wide band I′ color-difference signal to appear in the circuits which are designed for translating only the narrow band Q′ color-difference signal. In accordance with the system approved by the Federal Communications Commission, such cross talk many be eliminated by using a sharp cutoff low-pass filter at the output of only the decoder or detector for the narrow band Q′ color-difference signal and equalizing delays in the other channels. Also, the high-frequency portion of the wide band color-information signal must be boosted by a factor of two in order to make up for the loss of gain inherent in single side-band transmission. Such filtering systems, however, are difficult to construct. Because of these factors, it is common practice to cut off both the wide band I′ and the narrow band Q′ color-difference circuits at the same low frequency, namely, at a frequency corresponding roughly to the upper frequency limit for the narrow band Q′ color-difference signal. This results in equal treatment of both of the color-difference signals and simplifies the construction of the receiver. This practice, however, results in the loss of the high-frequency portion of the wide band I′ color-difference signal and, consequently, reduces the color resolution in the reproduced image.

It is an object of the invention, therefore, to provide a new and improved color-television system which substantially avoids one or more of the foregoing limitations of systems heretofore proposed.

It is another object of the invention to provide a new and improved color-television system for minimizing loss of resolution in the color image reproduced by the receiver with a minimum of colorimetric error incident to the single side-band transmission of a portion of the color subcarrier signal.

It is a further object of the invention to provide a new and improved color-television system which makes more efficient use of that portion of the subcarrier signal which is transmitted in a single side-band manner thereby to improve the quality of the reproduced color image.

It is yet another object of the invention to provide a new and improved color-television system which is capable of increasing the maximum resolution of the reproduced image beyond that which is attainable in a present-practice wide band-narrow band system.

It is an additional object of the invention to provide a new and improved color-television system which minimizes loss of resolution in the reproduced luminance component and which, at the same time, is compatible with existing monochrome receivers.

It is yet another object of the invention to provide a new and improved color-television system whereby more accurate resolution is obtained in color areas of the reproduced image.

It is a still further object of the invention to provide a new and improved color-television system which minimizes the limitation at the receiver due to cross talk of the single side-band component of the color subcarrier signal while, at the same time, permitting use of the full band width of the wide band color-difference signal.

It is another object of the invention to provide a new and improved color-television system which makes practical a simplified construction of the receiver.

It is a further object of the invention to provide a new and improved color-television system which enables the receiver to demodulate the subcarrier signal along any desired axes and, accordingly, is not constrained by a preferred or special set of axes as is the case where wide band I′ and narrow band Q′ subcarrier components are transmitted.

In accordance with the invention, a system for transmitting a color-television signal including component signals representative of three characteristics of the color image being televised while minimizing subjective loss of resolution in the reproduced color image at a receiver comprises circuit means responsive to the component signals for generating a monochrome signal which conveys brightness and resolution information; circuit means responsive to the low-frequency components of the component signals for generating a double side-band portion of a sub-carrier signal for determining large area image color, and circuit means responsive to both the low-frequency and high-frequency components of the component signals for generating a single side-band portion of the subcarrier signal. The system also includes circuit means for developing a correction signal derived from the single side-band components of the subcarrier signal and varying with the large area color, and circuit means for combining the double side-band and the single side-band subcarrier signals and the correction signal for transmission, whereby the luminance components of the modulated subcarrier signals contribute usefully to the resolution of the reproduced image.

For a better understanding of the present invention, together with other and further objects thereof, reference is had to the following description taken in connection with the accompanying drawings, and its scope will be pointed out in the appended claims.

Referring to the drawings.

Figure 1:
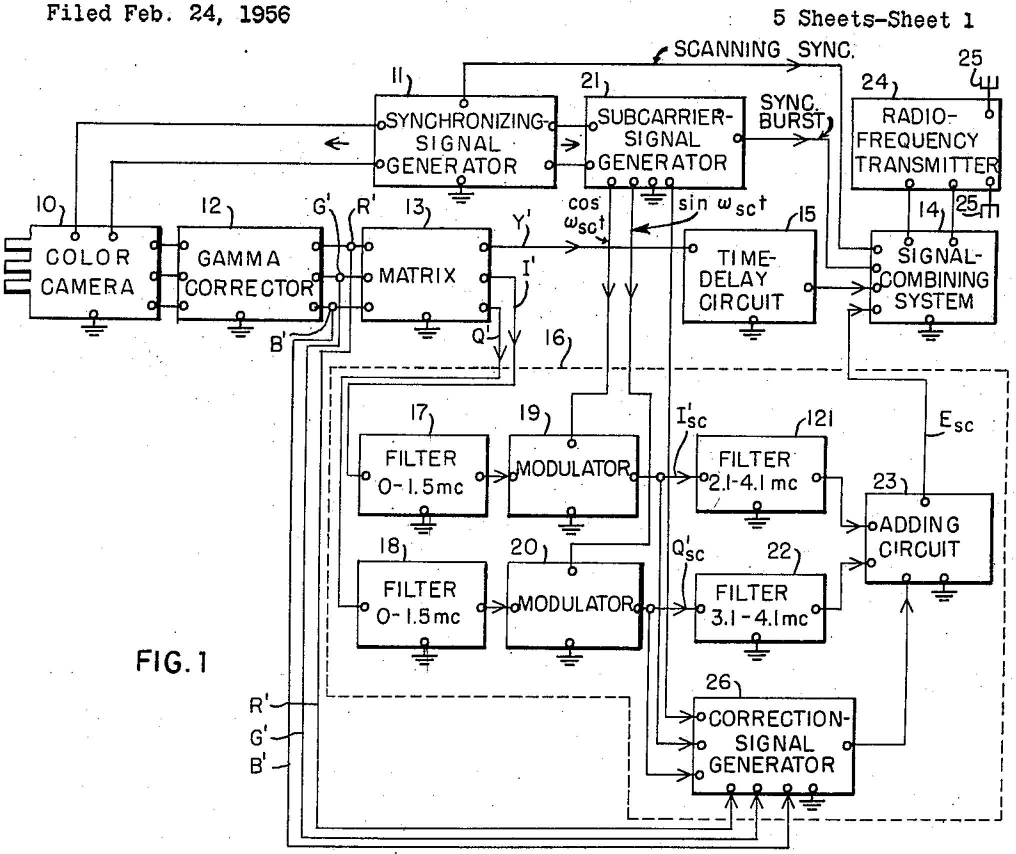
Fig. 1 is a circuit diagram of a complete color-television transmitter constructed in accordance with the present invention.
Figure 4:
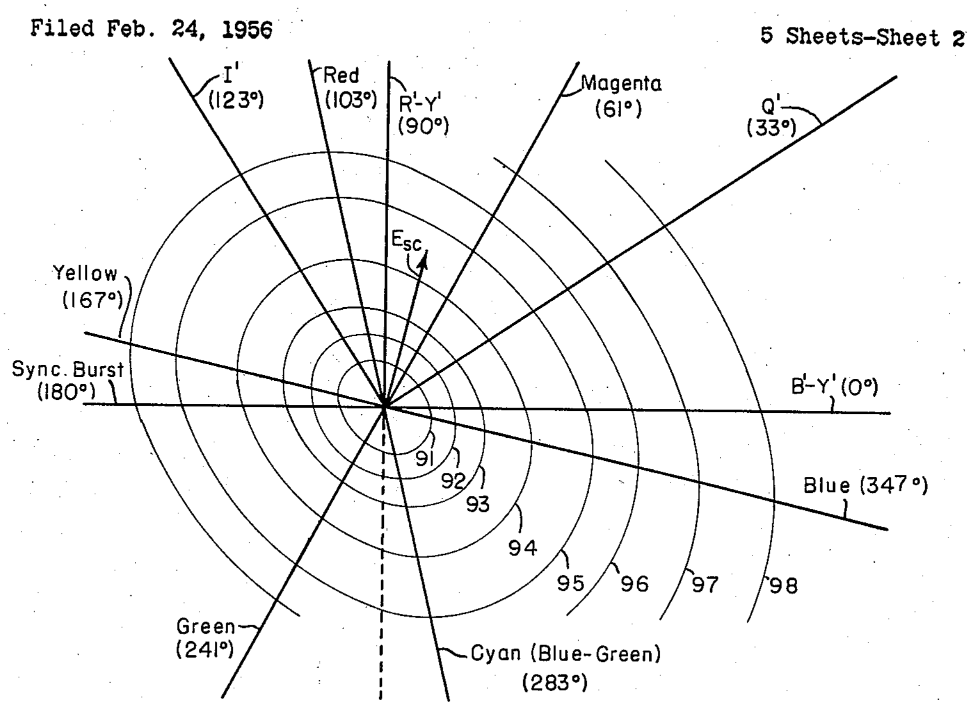
Fig. 4 is a subcarrier signal vector diagram representing the various possible amplitude and phase positions of the composite color subcarrier signal developed in the Fig. 1 transmitter in terms of the corresponding image colors.
Figure 7A:
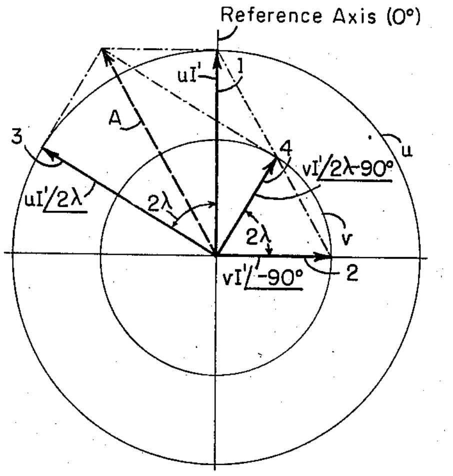
Figure 7B:
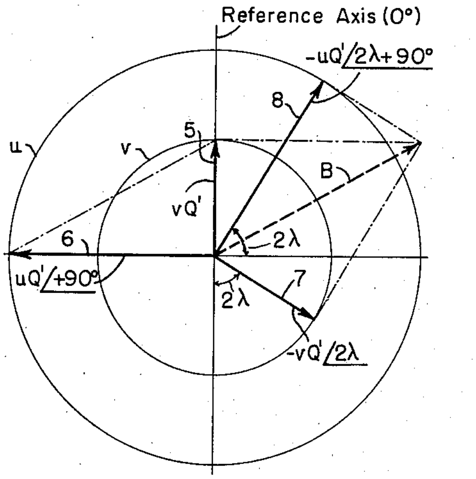
Figure 8:
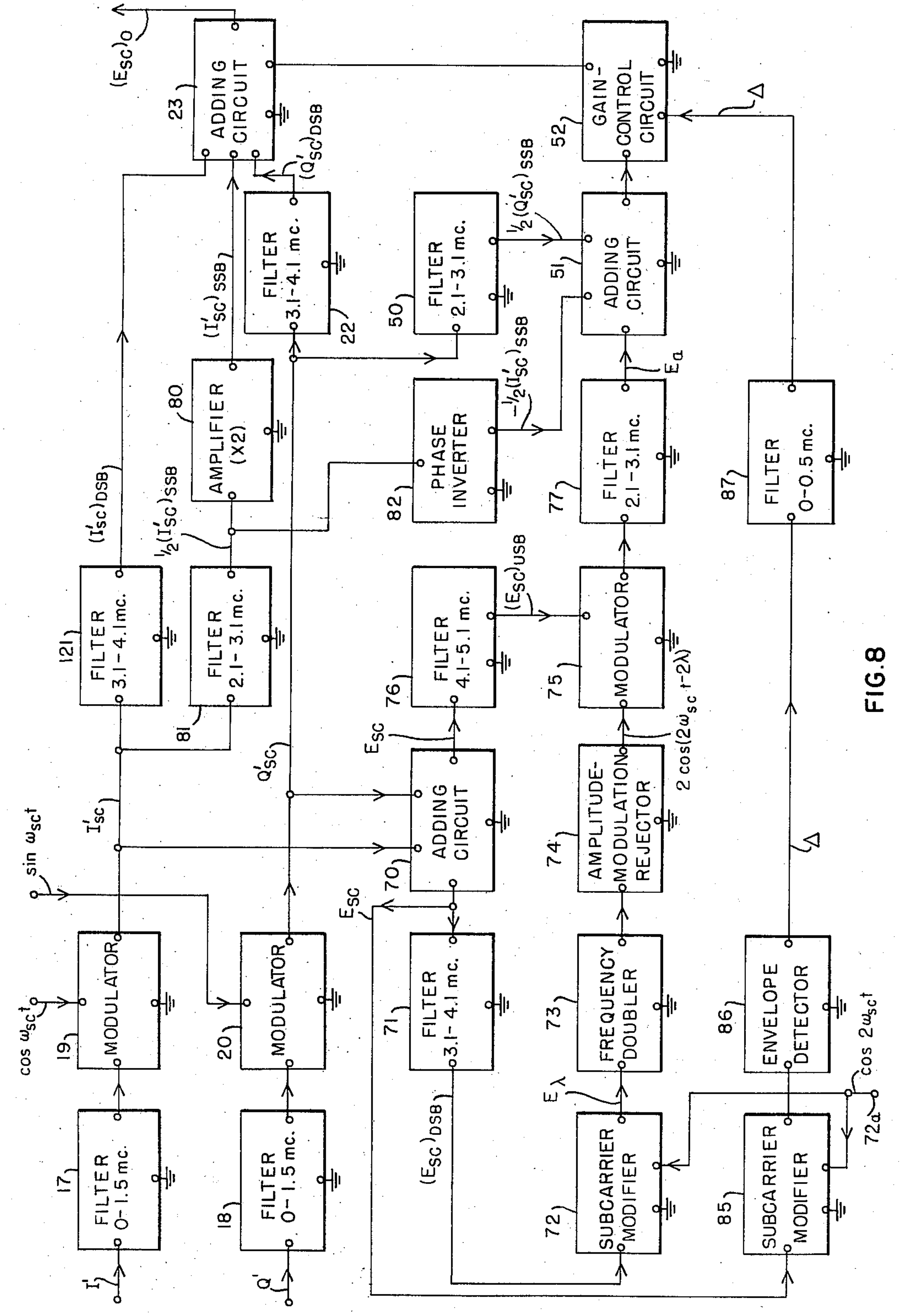
Figure 9:
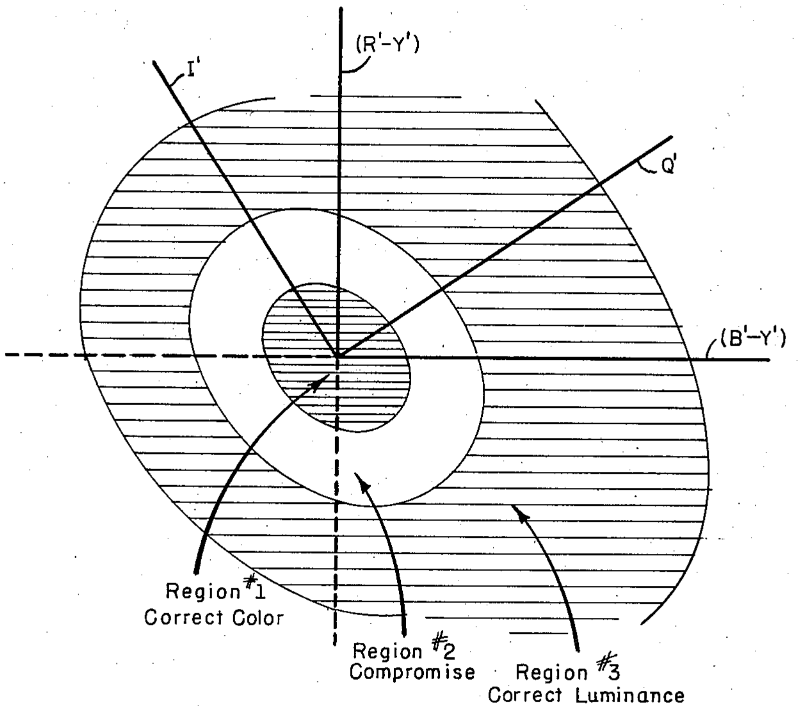
Figure 10:
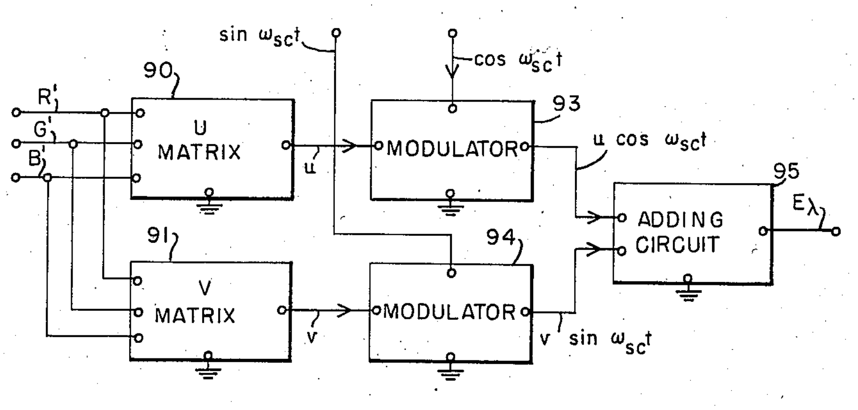

Figs. 7*a* and 7*b* are vector diagrams used in explaining the operation of the invention;

Fig. 8 is a detailed circuit diagram of one form of subcarrier signal channel that may be used in the transmitter of Fig. 1;

Fig. 9 is a subcarrier signal diagram similar to Fig. 4 except that various subcarrier signal regions have been indicated in order to explain the operation of the present invention, and Fig. 10 is a circuit diagram of a modified form of a portion of the subcarrier signal channel of Fig. 8.

*Transmitting system of Fig. 1*

Referring now to Fig. 1 of the drawings, there is shown a color-television transmitter constructed in accordance with the present invention. Part of the transmitter is constructed substantially in accordance with present-day practice in the color-television art while another part, especially the color subcarrier signal channel of the transmitter, is additionally constructed in accordance with the present invention and, hence, embodies modifications not found in present-day color-television transmitters.

Considering the transmitter of Fig. 1 in more detail, a color-television camera 10 is utilized to develop electrical signals representative of three characteristics of the color image being televised. As is well known, in order to completely describe a colored object, three independent characteristics or quantities must be specified. One choice of such three independent quantities are the three primary colors red, green, and blue. Instead of using these primaries, the three C.I.E. primaries X, Y, and Z may be specified or perhaps such colors may be specified in terms of three attributes representative of the brightness, hue, and saturation. In present-day color-television systems it is the practice to have the color camera 10 develop three electrical signals effectively representative of the three primaries red, green, and blue. These three signals are subsequently modified so that the transmitted signal is effectively in terms of three different color attributes, namely, a gamma-corrected monochrome signal Y′ and two gamma-corrected color-difference signals commonly referred to as I′ and Q′ signals. The monochrome signal Y′ is intended to carry most of the luminance information while the I′ and Q′ transmission primaries together carry the remainder of the image information including the hue and saturation information.

Prior to the presently adopted signal standard, the transmission primaries carried by the subcarrier signal were conventionally described in terms of the color-difference signals $R'-Y'$ and $B'-Y'$. Such color-difference signals are related to the present I′ and Q′ signals in that they represent different mixtures of the three primary signals developed by the color camera 10. The term "color difference" implies that such signals represent color information which is added to monochrome information at the receiver to obtain signals which control the several colored light sources. Actually, as will be discussed hereinafter, significant luminance information is conveyed by the color-difference signals but only because it was heretofore not thought to be completely practical to fully attain the ideal of constant luminance which is the principle that the chrominance signals should not contribute any luminance.

From the foregoing, it is apparent that there are several alternative ways of denoting the three image characteristics represented by the camera 10 signals as well as the transmitted signals. In this regard, it should be pointed out that the present invention is not limited to any special one of these types of designation because it is useful with any of them. In order to make the invention more readily understandable, however, the invention will be described in terms presently encountered in everyday practice. Accordingly, the color camera 10 may be, for example, any conventional type of color camera for developing the three electrical signals representative of the red, green, and blue primary colors of the image being televised.

Synchronizing signals for controlling the picture scanning of the color camera 10 are supplied thereto by a synchronizing-signal generator 11 which may be of conventional construction. Also, in accordance with present practice, the three red, green, and blue signals from the camera 10 are supplied to a gamma corrector 12 which serves to individually alter each of the red, green, and blue signals so as to compensate for the nonlinear input-output characteristic of the color-image-reproducing device or picture tube in the television receiver. The gamma corrector 12 may be of conventional construction.

The gamma-corrected red, green, and blue signals are next supplied to a matrix 13 which serves to combine these three signals in selected proportions so as to produce the desired transmission primaries. In accordance with present practice, one of the transmission primaries is a monochrome signal, designated by the symbol Y′, which serves to convey brightness and resolution information concerning the color image being televised. The other two transmission primaries are color-difference signals designated by the symbols I′ and Q′. The matrix 13 may be of conventional construction.

The monochrome signal Y′ is, in turn, supplied by way of a monochrome-signal channel to a signal-combining system 14. As shown, such monochrome-signal channel comprises a time-delay circuit 15 which serves to equalize the time delays of the wide band monochrome channel and the narrower band subcarrier signal channel which is indicated generally by the dashed line box 16. The time-delay circuit 15 may be of conventional construction. In addition, the monochrome channel may, if desired, include one or more stages of signal amplification.

The two color-difference signals I′ and Q′ are supplied to the subcarrier signal channel, indicated within the dashed line box 16, which serves to develop the desired subcarrier signal. More specifically, the I′ and Q′ color-difference signals are supplied by way of the respective filters 17 and 18 to the respective modulators 19 and 20. The pass bands of the filters 17 and 18 are somewhat different from the customary practice for reasons relating to the present invention. In particular, the band width of filter 18 has been widened to an upper limit of 1.5 megacycles as opposed to the present-practice limit of 0.5 megacycle. The modulators 19 and 20, however, may be of conventional construction and serve to encode or modulate the respective I′ and Q′ video signals onto their respective ones of a pair of quadrature-phased subcarrier signals. To this end, a subcarrier signal generator 21 is also included in the transmitter and serves to develop the two subcarrier signals which are in phase quadrature, that is, differ in phase by 90° with respect to one another. These are continuous wave signals and, in accordance with present practice, have a frequency of approximately 3.58 megacycles. One of the subcarrier signals is supplied to the modulator 19 while the other is supplied to the modulator 20. The subcarrier signal generator 21 may be of conventional construction.

At this point, it is useful to consider the frequency spectrums of the three transmission primaries Y′, I′, and Q′. For this purpose reference is now made to Fig. 2 of the drawings which shows the video spectrums for these transmitted signals. The spectrums shown are in accordance with the signal standard presently approved by the Federal Communications Commission. As indicated, the band width of the monochrome signal Y′, on a video-frequency basis, that is, prior to being encoded on a carrier, extends from 0 to approximately 4 megacycles. In this regard, however, it should be noted that it is sometimes the practice to use only a 3 megacycle band width for this monochrome signal in order to reduce interference between the monochrome and the 3.6 megacycle subcarrier signal. Regardless of the type of monochrome-signal band width which is transmitted, the receiver monochrome band width is often limited to about 3 megacycles. This modified 3 megacycle band width is indicated by the dashed line portion of the upper curve in Fig. 2. On a video-frequency basis, the band width of the I′ color-difference signal is approximately 0 to 1.5 megacycles while the band width for the Q′ signal is approximately 0 to 0.5 megacycle. As indicated, the video portion of the I′ signal from approximately 0.5 to 1.5 megacycles is to be transmitted in a single side-band (SSB) manner. As indicated by the spectrum curves, the various frequency regions do not have sharp boundaries. Accordingly, the mention of specific frequency ranges, both at this point and hereinafter, is intended to indicate the approximate ranges only.

Figure 2:
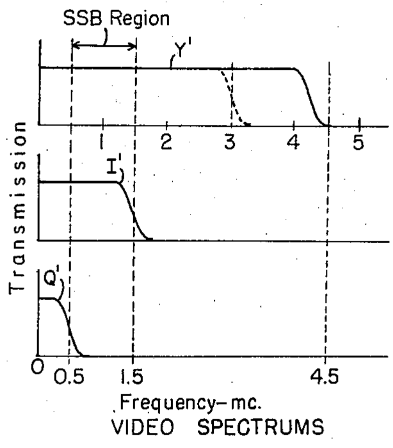
Figs. 2 and 3 are graphs representing the frequency spectrums of various signals developed in the Fig. 1 transmitter.

With regard to the Fig. 2 band-width curves, it should be remembered that the higher the frequency of the video signal the finer the picture detail that this signal represents. In other words, the video-frequency information lying within the 0 to 0.5 megacycle range represents coarse detail information concerning the image being televised whereas, for example, the portion of the monochrome signal Y′ over the 2 to 3 megacycle region represents very fine or minute detail information concerning the image. The portion of the I′ signal over the single side-band region, that is, the 0.5 to 1.5 megacycle region, which is of particular interest in the present invention, represents an intermediate type of picture detail which is fairly fine in nature but not as fine as the higher frequency portion of the monochrome signal.

The reason for the differences in band widths for the three signals is due to the properties of the human eye. In other words, with regard to very fine detail information, the human eye is usually presumed to be only capable of resolving luminance characteristics thereof. With regard to the frequency range occupied by the single side-band components of the I′ signal, the human eye is believed capable of recognizing some colors with some degree of detail. Lastly, the eye is least sensitive to some other colors for which the Q′ signal is the approximation used in the presently adopted system. In other words, the eye can appreciate some color differences only when they are fairly extensive in area or, in other words, rather coarse in nature. It is thus apparent that the eye may be loosely described as having different band-width limitations, in some as yet undetermined coordinate system, for the different colors of the image being televised. These band widths of the eye are represented roughly by the spectrum curves for the Y′, I′, and Q′ signals. As mentioned, the spectrum curves for the I′ and Q′ signals of Fig. 2 actually represent the effective band widths with which such signals are encoded or modulated onto their respective subcarriers.

Figure 3:
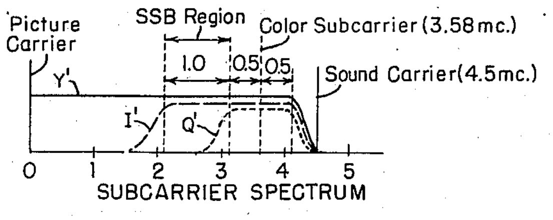

In order to visualize the frequency relationships which are obtained after the I′ and Q′ signals are encoded onto their respective subcarriers, reference is had to Fig. 3 of the drawings. Both of the quadrature-phased subcarriers are of approximately 3.6 megacycles. After encoding, the signal spectrums for the I′ and Q′ signals are as shown in Fig. 3. Fig. 3 also indicates the fact that part of the I′ signal is to be transmitted in a single side-band manner by the fact that the band width thereof is not the same on the two sides of the 3.6 megacycle subcarrier. This single side-band region corresponds to the video-frequency components within the region from 0.5 to 1.5 megacycles in Fig. 2. It is thus apparent that the single side-band portion of the subcarrier signal conveys fine detail color information while the coarse detail I′ information is transmitted in a double side-band manner as is the coarse detail Q′ information.

Returning now to the transmitter circuit diagram of Fig. 1, the encoded subcarrier signals from the modulators 19 and 20, respectively designated by the symbols $I_{sc}'$ and $Q_{sc}'$ to indicate that they have been encoded onto the subcarrier, are, in turn, supplied by way of the respective filters 121 and 22 to an adding circuit 23. In accordance with present practice, the pass bands of these filters 121 and 22 are effectively designed to coincide approximately with the respective subcarrier pass bands indicated in Fig. 3. As a result, the I′ subcarrier signal at the output of the filter 121, that is, a portion of this signal, is single side band in nature. These filters 121 and 22 may be of conventional construction. The adding circuit 23 simply serves to add the two subcarrier signals together to produce a resulting composite subcarrier signal, designated by the symbol $E_{sc}$, which, in nature, is a single signal of subcarrier frequency which is varying in both amplitude and phase. The adding circuit 23 may be of conventional construction, such as that shown schematically in Figure 18–12, page 641 of the textbook "Wave Forms," M.I.T. Radiation Laboratory Series, McGraw-Hill Book Company, 1949.

The possible amplitude and phase variations of the resultant subcarrier signal $E_{sc}$ is indicated by the subcarrier signal diagram of Fig. 4. It will be noted from this diagram that the phase of the composite subcarrier signal determines the hue or dominant color of the reproduced image. The amplitude of this resultant subcarrier signal determines the saturation of the color being reproduced because saturation is that attribute of a color which signifies the pure color content or the amount of pure spectral color in comparison to the amount of white that is combined to produce the color. The white data is carried by the monochrome signal while color-difference data is carried by the subcarrier signal. Hence, the greater the amplitude of the subcarrier signal relative to the monochrome signal the greater is the saturation or purity of the reproduced color. From Fig. 4 it will be apparent that the presently used I′ and Q′ color-difference signals convey colorimetric information on two perpendicular axes, the combination of which, of course, is capable of producing a vector at any of the intermediate angles. The same thing applies where the color-difference signals $R'-Y'$ and $B'-Y'$ are, instead, utilized. As previously mentioned, the signal axes for the I′ and Q′ signals were selected to represent a rough approximation to an assumed optimum pair of fixed wide band and narrow band color axes of the human eye.

The transmitted monochrome signal Y′ is derived from the gamma-corrected red, green, and blue color signals which may be denoted by the symbols R, G, and B. The composition of this monochrome signal, commonly denoted by the symbol $E_y'$, may be represented by the following expression:

$$E_y'=0.30R'+0.59G'+0.11B' \quad (1)$$

The prime symbols attached to the three color signals R. G, and B denote that these signals have been gamma-corrected. More particularly, it presently denotes that these signals have been raised to the $1/\gamma$ power where $\gamma$ represents the power-law factor of the picture tube in the receiver. For most present-day picture tubes this factor $\gamma$ is approximately equal to two (2) which indicates that such picture tubes are essentially square-law devices. This is a fair assumption and shall be made throughout the remainder of the specification.

The effect of developing a gamma-corrected monochrome signal by individually gamma-correcting the color signals, as indicated by Equation 1, is to make the monochrome signal of such form that not all of the luminance information is conveyed by the monochrome signal. The luminance information which is not conveyed by the monochrome signal should be conveyed by the color subcarrier signal. This fact that the subcarrier signal conveys some luminance information is indicated in the Fig. 4 subcarrier signal diagram by the elliptical contour lines 91–98, inclusive. Each contour line represents a fixed value of subcarrier luminance and the amount of such subcarrier luminance increases in the same direction as the reference numerals 91–98 increase. It should be noted, however, that successive subcarrier luminance contours are not intended to represent equal increments of such subcarrier luminance. The amount of luminance carried by the subcarrier signal increases as the saturation of the image color increases and as the square of the amplitude of the subcarrier signal for any one phase angle. For image colors lying on the gray scale, that is, for blacks, grays, and whites, the subcarrier signal amplitude falls to zero and all of the luminance information is conveyed by the monochrome signal.

The distribution of reproduced luminance between the monochrome and subcarrier signals may be represented by the following mathematical expresstion when $\gamma=2$:

$$Y_t=Y_m+Y_{sc} \quad (2)$$

where $Y_t$=total reproduced luminance (for a given picture element) as seen by human eye $Y_m$=luminance information carried by the monochrome signal $Y_{sc}$=luminance information carried by the subcarrier signal The important point regarding this expression is that the subcarrier luminance is an additive factor. It may be shown mathematically that this subcarrier luminance may be expressed in terms of the conventional red, green, and blue color-difference signals as follows:

$$Y_{sc}=0.30(R'-Y')^2+0.59(G'-Y')^2+0.11(B'-Y')^2 \quad (3)$$

where $R'-Y'$=red color-difference signal
$G'-Y'$=green color-difference signal
$B'-Y'$=blue color-difference signal For present purposes it is convenient to utilize the known relationships between the red, green, and blue color-difference signals and the I′ and Q′ color-difference signals to obtain an expression for such subcarrier luminance in terms of the I′ and Q′ color-difference signals, such expression being as follows:

$$Y_{sc}=0.46(I')^2+0.151'Q'+0.67(Q')^2 \quad (4)$$

The relationship of Equation 4 lends itself readily to a mathematical derivation to be given hereinafter.

The fact that some luminance information may be conveyed by the subcarrier signal causes a loss of the high-frequency portion of such subcarrier luminance information because of the limited band widths of the subcarrier and color-difference signal channels in both the transmitter and the receiver. In addition, the use of relatively narrow band circuits for the Q′ subcarrier components compared to the use of relatively wider bandwidth circuits for the I′ subcarrier components results in even more loss of subcarrier luminance information for some signal components lying within the range of frequencies for which single side-band transmission is used. This is because the circuits for the Q′ subcarrier components are customarily designed so as to reject signal components corresponding to the single side-band region. It is a primary purpose of the present invention to reduce the loss of image resolution corresponding to this loss of single side-band subcarrier luminance information.

The loss of image resolution represented by the loss of single side-band luminance information represents an undesirable limitation of the present-practice type of color-television system. The present invention recognizes this limitation and enables such limitation to be overcome by making more efficient use of the single side-band portion of the subcarrier signal in conveying picture information. In other words, in one aspect the present invention describes a method whereby the single side-band portion of the subcarrier signal may be modified to carry a larger amount of useful information, that is, information which the human eye can appreciate. To this end, the transmitting apparatus of Fig. 1 includes means for generating and transmitting the single side-band portion of the subcarrier signal so that encoding of the fine detail information carried thereby is controlled by the local large area color of the corresponding portion of the image to make the proportioning of the information content of such single side-band portion vary with local color and, hence, more nearly in accordance with the properties of the human eye.

In color-television systems heretofore proposed, such systems have utilized so-called "fixed" encoding of the subcarrier signal, that is, the colorimetric proportioning of the color-difference signals modulated onto the subcarrier signals has been fixed. As a result, only a fixed type of colorimetric information is conveyed by the conventional subcarrier signal. But, partly because the subcarrier contains luminance which appears to be the resolution-carrying coordinate, the optimum colorimetric encoding is not a constant one when expressed in terms of Y', I', and Q' but rather should vary in accordance with the local large area color of the image element being televised. In accordance with the invention, therefore, it is proposed to improve the apparent or subjective resolution of the reproduced color image by utilizing "variable" or signal-controlled encoding of the single side-band portion of the subcarrier signal so that the image information conveyed thereby is more nearly in accordance with the characteristics of the human eye. For example, in the more highly saturated colored areas where substantial amounts of luminance information should be conveyed by the subcarrier signal but might be partially lost due to the restricted subcarrier signal circuit band widths, the colorimetric composition of the subcarrier signal can be varied so as to minimize this loss of luminance information.

An illustrative manner of obtaining variable encoding of the single side-band portion of the subcarrier signal may be obtained by utilizing a correction-signal generator 26, described hereinafter in detail in connection with Fig. 8. The correction-signal generator 26 represents circuit means responsive to signal components representative of the camera signals for developing additional single side-band subcarrier components which will alter the colorimetric proportions of the image information carried by the single side-band portion of the subcarrier signal. This can be used to reduce the loss of luminance information normally caused by the limited band-width Q' channel circuits. This objective depends on the form of receiver as well as the form of the transmitter. In some forms of receiver, particularly the present nominal form, it is not possible to obtain the desired performance. On other forms, in the presence of single side-band components, there is single side-band quadrature cross talk in the receiver. Accordingly, it is necessary that the correction-signal generator 26 develop the additional single side-band subcarrier components for altering the colorimetric proportions of the subcarrier signal so as to minimize the visibility of such single side-band cross-talk components on a specific form of receiver which is different from the present one. We are, thus, as much concerned with the form of receiver as the form of transmitter.

In order to generate the needed additional subcarrier components, the correction-signal generator 26 may obtain the necessary colorimetric data for controlling the variable encoding of the single side-band portion of the subcarrier signal by connecting such generator to the output terminals of, for example, the gamma corrector 12 and constructing the generator 26 to respond to the gamma-corrected red, green, and blue color signals at the output terminals of such gamma corrector 12. As an alternative, the required low-frequency colorimetric information may be obtained from the encoded subcarrier signals at the outputs of the modulators 19 and 20. This is because the modulation components of such subcarrier signals contain fixed and known proportions of the red, green, and blue color signals. In fact, in some forms of the invention the complexity of the correction-signal generator 26 may be somewhat less if such low-frequency color information is derived from the outputs of the modulators 19 and 20. Both of the illustrative types of connections have been shown in Fig. 1 and it will be understood that either both or only one or the other of the connections may be used to develop the desired additional single side-band components. Other types of connections will also be apparent to those skilled in the art. The point is that lower frequency colorimetric information is needed by the correction-signal generator 26. Such information is available at many points in the transmitter and, hence, may be obtained from any of these points that is convenient. Also, unmodulated subcarrier reference signals from the subcarrier signal generator 21 may also be utilized in the correction-signal generator 26.

The resultant subcarrier signal $E_{sc}$ at the output of the adding circuit 23 of Fig. 1 is, in turn, supplied to the signal-combining system 14. Such signal-combining system 14 serves to add together the monochrome signal coming from the time-delay circuit 15 and the composite chrominance subcarrier signal. Also supplied to the signal-combining system 14 are the various synchronizing signals which are needed in the receiver for synchronizing the operation thereof. Firstly, deflection or scanning synchronizing signals are supplied from the synchronizing-signal generator 11. These signals will subsequently serve to control the scanning of the electron beam of the image-reproducing device or picture tube in the receiver. Also, a sync burst signal is supplied by the subcarrier signal generator 21. This signal is a short burst of 3.58-megacycle subcarrier signal which is placed on the back porch of the line-synchronizing signals coming from the generator 11. Such sync burst signals will serve to synchronize the operation of the chrominance-signal demodulators or detectors in the receiver. After being combined in a straightforward additive manner by the signal-combining system 14, which may be of conventional construction, these combined signal components are supplied to a radio-frequency transmitter 24 wherein they are modulated onto a radio-frequency carrier signal and then transmitted by way of the antenna 25 to the receiver. Because of the relationship between the frequency of scanning the image elements and the frequency of the subcarrier, the monochrome and subcarrier components are effectively transmitted in a frequency-interleaved manner.

Figure 5:
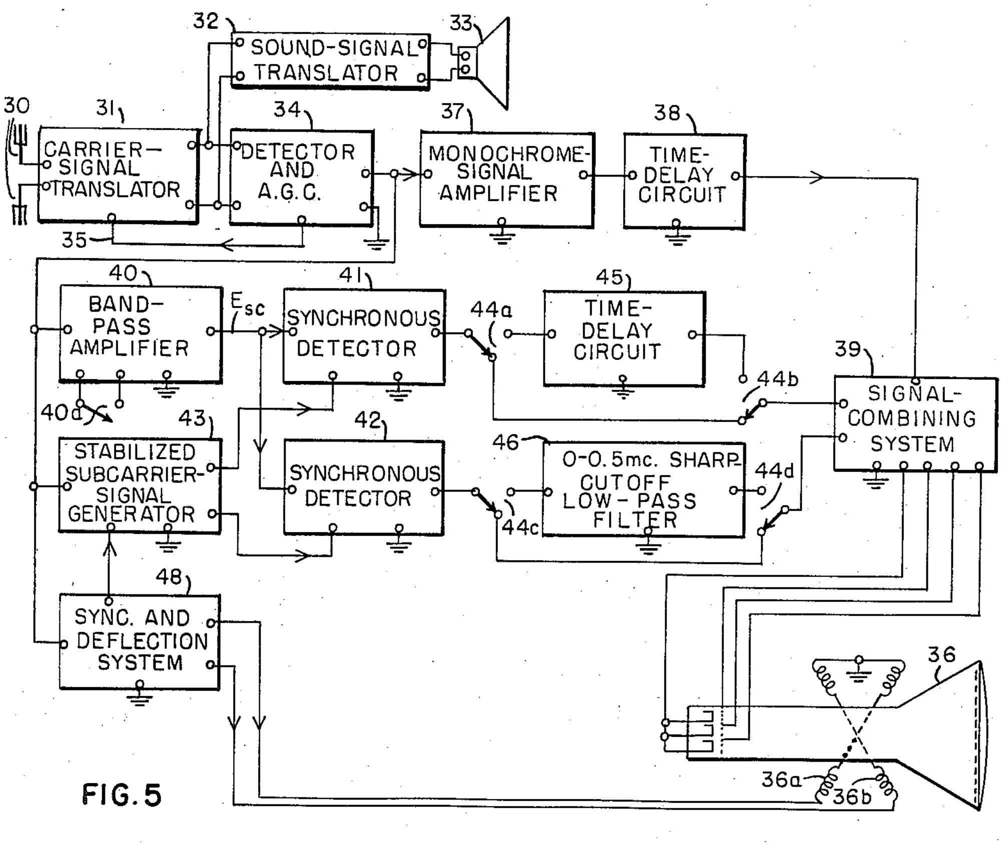
Fig. 5 is a circuit diagram of a complete color-television receiver including provisions for illustrating the possible changes when such receiver is constructed in accordance with the present invention.

*Receiver of Fig. 5*

Referring now to Fig. 5 of the drawings, there is shown a color-television receiver which indicates possible modifications that may be obtained in accordance with the present invention. Considering first the operation of the conventional portions of such receiver, the transmitted color-television signal is intercepted by a receiving antenna 30 and supplied to a carrier-signal translator 31. This carrier-signal translator may include the usual circuits for providing radio-frequency amplification, signal heterodyning to reproduce an intermediate-frequency signal, and suitable intermediate-frequency amplifiers. Such circuits may be of conventional construction. The sound-signal component of the intermediate-frequency signal at the output of the signal translator 31 is supplied to a sound-signal translator 32 and then to a loudspeaker 33. The sound-signal translator 32 may include the usual frequency-modulation detector circuit and a suitable audio-frequency amplifier circuit, both of which may be of conventional construction. The remainder of the intermediate-frequency signal at the output terminals of the translator 31 is supplied to a detector and automatic-gain-control (AGC) unit 34 which serves to detect the intermediate-frequency signal and, hence, to supply video-frequency signal components at the output thereof. The AGC portion of the unit 34 serves to develop the usual control signal which is fed back by way of a conductor 35 for controlling the gain of appropriate stages in the carrier-signal translator 31. Such unit 34 may be of conventional construction.

The monochrome-signal component of the composite video-frequency signal at the output terminals of the detector 34 is, in turn, supplied by way of a monochrome channel to a color-image-reproducing device or color picture tube 36. Such monochrome channel may include a monochrome-signal amplifier 37 and a time-delay circuit 38 for equalizing the time delay of the relatively wide band monochrome channel and the relatively narrow band subcarrier signal channel. Both the monochrome-signal amplifier 37 and the time-delay circuit 38 may be of conventional construction. The monochrome signal Y′ at the output of the time-delay circuit 38 is supplied to a signal-combining system 39.

The subcarrier signal component of the composite video signal at the output of the detector 34 is supplied by way of a subcarrier signal channel to the picture tube 36. Such subcarrier signal channel may comprise a band-pass amplifier 40 and a pair of synchronous detectors 41 and 42. Also supplied to the synchronous detectors may be a pair of appropriately phased subcarrier reference signals which are developed by a stabilized subcarrier signal generator 43. Each of the synchronous detectors 41 and 42 may be of conventional construction and each operates in a conventional manner to derive from the composite subcarrier signal the color-difference signal which was encoded at the transmitter on a subcarrier of the same phase angle as the reference signal supplied by the signal generator 43. In this manner, for example, the detector 41 may be used to derive the I′ color-difference signal from the composite subcarrier signal $E_{sc}$ supplied thereto. Similarly, the synchronous detector 42 may be used to derive, for example, the Q′ color-difference signal. The reference signals supplied by the generator 43 are synchronized in phase with the corresponding subcarrier signals at the transmitter by way of the transmitted sync burst component, which component is supplied to the signal generator 43 and serves to activate the appropriate circuits therein for maintaining the locally generated reference signals in synchronism with the corresponding signals at the transmitter. Such signal generator 43 may be of conventional construction.

A plurality of switches 40*a* and 44*a*–44*d*, inclusive, have been included for explanatory purposes and, to this end, the position of these switches determines whether the receiver is designed to operate with the presently approved color-television signal or, on the other hand, whether it is designed to operate with a modified form of color-television signal which is modified in accordance with the present invention. More particularly, when the switches 44*a*–44*d*, inclusive, are in the upper positions (just the opposite of those shown), then the receiver is designed to operate with the presently approved form of color-television signal. In this case, the I′ signal at the output of the synchronous detector 41 is supplied by way of a time-delay circuit 45 to the signal-combining system 39. This time-delay circuit 45 serves to equalize the time delay of the relatively fast I′ signal channel with the relatively slow Q′ signal channel. The Q′ signal channel is slower because the pass band thereof is more limited. Similarly, the Q′ signal at the output of the synchronous detector 42 is supplied by way of a sharp cutoff low-pass filter 46 to the signal-combining system 39. This filter 46 is what causes the Q′ channel transmission time to be slower than that of the I′ channel.

The signal-combining system 39 is a matrix circuit which serves to matrix the detected I′ and Q′ color-difference signals to obtain the red, green, and blue color-difference signals which, in turn, may be supplied directly to, for example, the control electrodes of the picture tube 36. In this case, the signal-combining system 39 also serves to supply the monochrome signal Y′ to the cathodes of the picture tube 36.

The scanning synchronization components of the composite video-frequency signal at the output of the detector 34 are supplied to a deflection system 48 wherein they serve to synchronize the operation of suitable scanning-signal generators which, in turn, produce the usual scanning signals which are supplied to deflection windings 36*a* and 36*b* associated with the picture tube 36. Such deflection signals serve to cause the electron beam of the picture tube to scan back and forth across the display screen thereof to produce the customary raster pattern. Such deflection system 48 may be of conventional construction.

It is worthwhile to consider in detail the operation of the synchronous detectors 41 and 42 in terms of the subcarrier signal diagram of Fig. 4. Considering, for example, the synchronous detector 41, the phase of the locally generated reference signal of subcarrier frequency supplied thereto from the generator 43 determines the detection axis of the synchronous detector and such detection axis can be shown in the subcarrier signal diagram of Fig. 4. For example, assuming that the $B'-Y'$ axis represents a zero phase reference and that the local reference signal supplied to the detector 41 is at an angle of 123° relative thereto, then the synchronous detector 41 is effective to develop the I′ color-difference signal at the output thereof. If, on the other hand, the phase of the locally generated reference signal is made to be 90° with respect to the phase reference, then the synchronous detector 41 is effective to derive the $R'-Y'$ color-difference signal from the received color subcarrier signal. In a similar manner, by selecting other phases for the locally generated reference signal, signals along other colorimetric axes indicated in Fig. 4 may be derived. Similar considerations hold for the other synchronous detector 42.

A distinction must be made in the operation of a synchronous detector depending on whether the signal being received and detected thereby is double side band in nature or single side band in nature. For double side-band signals, assuming the case of I′ and Q′ detection axes, then only the I′ color-difference signal will appear at the output of synchronous detector 41 while no I′ color-difference signal will appear at the output of synchronous detector 42. Conversely, for the double side-band Q′ signal, a Q′ color-difference signal will appear at the output of detector 42 but not at the output of detector 41. This is because two independent side bands are sufficient to produce two independent outputs. This is not the case, however, where the signal being received and detected is single side band in nature. In the case of a single side-band signal, assuming, for example, the single side-band portion of the I′ signal, then the detected video-frequency component of such single side-band I′ signal appears at the output of synchronous detector 41 but it also causes an output from the synchronous detector 42. This phenomenon of the single side-band I′ signal also producing at an output from the Q′ detector 42 is commonly called "quadrature cross talk."

For the presently adopted color-television signal standard, the single side-band components occur within the video range of about 0.5 to 1.5 megacycles. Hence, it was planned to eliminate the cross-talk components at the output of synchronous detector 42 by use of a low-pass filter, such as the filter 46. One side band, properly used, would then produce one correct signal. The use of the filter 46, however, points out an inconsistency in the method of using the single side band in the presently adapted color-television system because the high-frequency Q′ color-difference information was assumed to be invisible and, hence, could be neglected without loss of actual picture information. If this were true, then the higher frequency single side-band components at the output of the Q′ synchronous detector 42 would be essentially invisible to the human eye and there would be no need for the filter 46. Actually, signal components at the output of the synchronous detector 42 often do contain significant amounts of visible information and, hence, the filter 46 is required to reject such information when it comes from quadrature cross talk. This is primarily due to the fact that the timing or phase of the cross-talk components is incorrect for the reproduced image. Rejection of the single side-band components, however, causes a loss of visible information which, in turn, causes a corresponding reduction in resolution of the reproduced color image. It should be noted that the magnitudes of the phase and amplitude errors of the cross-talk components vary with and are dependent on the basic color of the image element being televised. As a result, the magnitudes of such errors are clearly predictable and the errors may be corrected or minimized. A purpose of the present invention, therefore, is to modify the transmitted single side-band components so that the timing and amplitude of such components at the output of the synchronous detector 42 are substantially correct so that the filter 46 need no longer be used. Additionally, single side-band Q′ information, properly precorrected, will be added to the single side-band I′ information.

More precisely, the purpose of the present invention is to improve the resolution of the reproduced color image by modifying the transmission of information components which occur in the single side-band region. This requires modification of both the transmitter and receiver because the form of the transmitter is determined and limited by the form of the receiver and vice versa and both should be constructed to convey the maximum possible amount of useful information. Accordingly, a receiver constructed in accordance with the present invention should be constructed to provide a wide band width for the Q′ color-difference information as well as the I′ color-difference information and this wide band width should be maintained right up through the image-reproducing device. In other words, the detected modulation components of the subcarrier signal should be supplied to the image-reproducing device with a band width wide enough to include a major part of the single side-band information.

This modified form of receiver is superior to the present-practice receiver having relatively narrow band circuits for the Q′ color-difference signal because such modified receiver is not blind to high-frequency Q′ colorimetric changes. In other words, for the present-practice receiver, it would be difficult to produce colorimetric modifications in the direction of the Q′ color-difference axis because the use of the filter 46 renders the receiver blind to this type of colorimetric change. Accordingly, in a color-television receiver constructed in accordance with the present invention the low-pass filter 46 is eliminated and the band widths of the circuits which translate the signal components at the output of the synchronous detector 42 to the picture tube 36 are widened to correspond, for example, to the 0 to 1.5 megacycle band widths of the wide band circuits following the synchronous detector 41. In this manner, by increasing the band widths of the color-difference circuits following the synchronous detector 42 the information-handling capacity of the receiver is greatly increased. Of course, when a present-practice color signal is received, objectionable single side-band distortion will be produced. The present invention, however, modifies the transmitted single side-band components so that the information content of the single side-band components is made to be more nearly in accordance with the properties of the human eye. In this manner, the present invention makes practical a form of color-television receiver which was heretofore thought to be highly undesirable.

As shown in Fig. 5, the Q′ signal band limiting in a conventional receiver occurs after the synchronous detector 42, such band limiting being obtained by the filter 46. For some forms of image-reproducing devices, especially for picture tubes of the one-gun type, it is sometimes more convenient to provide such band limiting ahead of or before the synchronous detector, the appropriate filters being of a band-pass type. To practice the present invention, such filters would be modified to provide the desired wide band treatment of the Q′ color-difference information.

Additional advantages also result from the modification of making both of the receiver color-difference signal channels wide and equal in band width. In the first place, the time-delay circuit 45 is no longer needed. Neither is the sharp cutoff low-pass filter 46. Hence, for receiving a color signal in accordance with the present invention, the switches 44*a*—44*d*, inclusive, would be switched to the lower positions as shown in Fig. 5. These switches and the units 45 and 46 would not actually be present in the actual color receiver constructed in accordance with the present invention and are only shown in Fig. 5 for the purpose of comparison. The color-difference signal channels, of course, still have an upper band-width limit, namely, about 1.5 megacycles. Another additional advantage which accrues is that the amount of time delay that must be supplied in the monochrome-signal channel by the time-delay circuit 38 is less due to the fact that the transmission time of what was formerly the narrow band Q′ color-difference channel has been decreased by increasing the band width thereof.

In a present-practice color system, the synchronous detectors 41 and 42 must of necessity derive the I′ and Q′ color-difference signals if the single side-band I′ information is to be utilized. In this manner, a present-practice receiver is restricted to detection along a special pair of axes. A receiver in accordance with the present invention, however, is not so limited. This results from the equal band-width treatment of both of the detected color-difference signals. As a consequence of not being limited to any special detection axes, the benefit of reduced complexity in the signal-combining system 39 may be obtained by, for example, detecting directly on the R′—Y′ and B′—Y′ axes.

In a present-practice receiver where the single side-band I′ information is to be utilized, it is common practice to provide an additional gain of two for the single side-band I′ signal components to compensate for the half-amplitude signal loss inherent in single side-band transmission. Such gain of two is commonly provided in the band-pass amplifier 40. In conjunction with the present invention, it appears to be more convenient and desirable to provide such gain of two at the transmitter. Elimination of such single side-band gain from the band-pass amplifier 40 is indicated when the switch 40*a* is in the upper position. From the foregoing, it is apparent that the present invention not only improves the resolution of the reproduced color image but also provides a receiver of reduced complexity and cost.

*Derivation of modified signals*

In order to determine the modification required of the single side-band portion of the subcarrier, it is necessary to have a method of distinguishing between the reproduced luminance contributed by the low-frequency double side-band portion of the subcarrier signal and that contributed by the high-frequency single side-band portion of the subcarrier signal so that the luminance of the single side-band portion can more easily be found. In present-practice systems, only a portion of the I′ signal is transmitted in a single side-band manner. In accordance with the present invention, a corresponding portion of the Q′ signal will also be transmitted in a single side-band manner. This increases the information-handling capacity of the system and facilitates the desired modification of the information content of the single side-band portion of the subcarrier signal. It also means that Q′ single side-band components must be taken into account in determining the desired precorrection of the transmitted signal. A convenient way of obtaining an expression for the high-frequency single side-band (SSB) luminance contribution is afforded by resort to partial differential equations. Thus, the differential subcarrier luminance may be expressed as follows:

$$dY_{sc}=\frac{\partial Y_{sc}}{\partial I'}dI'+\frac{\partial Y_{sc}}{\partial Q'}dQ' \qquad (5)$$

where $dY_{sc}=(Y_{sc})_{SSB}$=component of luminance transient due to the (SSB) luminance $\frac{\partial Y_{sc}}{\partial I'}=u=I'$ signal luminance sensitivity for high-frequency (SSB) components $dI'=I'_{SSB}$=high-frequency (SSB) portion of I′ signal transient component $\frac{\partial Y_{sc}}{\partial Q'}=v=Q'$ signal luminance sensitivity $dQ'=Q'_{SSB}$=high-frequency (SSB) portion of $Q'$ signal transient component From this it will be apparent that the differential luminance given by Equation 5 corresponds to only the luminance contributed by the high-frequency single side-band portion of the subcarrier signal which is the portion that is of interest here.

Expressing the relationship of Equation 5 in terms of the single side-band (SSB) subscript notation given in connection therewith leads to the following simplified expression for the reproduced subcarrier luminance contributed by the single side-band portion of the subcarrier signal:

$$(Y_{sc})_{SSB}=uI'_{SSB}+vQ'_{SSB} \qquad (6)$$

The quantities $u$ and $v$ may be evaluated by use of Equation 4. Thus, taking the partial derivative of Equation 4 corresponding to the factor $u$ gives the following relationship:

$$u=2(0.46)I'+0.15Q' \qquad (7)$$

Because the I′ and Q′ signals are composed of known fractions of the gamma-corrected primary color signals R′, G′, and B′, the factor $u$ may be expressed also in terms of the gamma-corrected primary color signals R′, G′, and B′ as follows:

$$u=0.58R'-0.34G'-0.24B' \qquad (8)$$

Similarly, by taking the partial derivative of Equation 4 which corresponds to the factor $v$ gives the following relationship for such factor:

$$v=2(0.67)Q'+0.51I' \qquad (9)$$

As before, this may also be expressed in terms of the primary color signals R′, G′, and B′ as follows:

$$v=0.37R'-0.74G'+0.37B' \qquad (10)$$

From Equations 8 and 10, it will be apparent that the luminance sensitivities for the single sideband portions of the I′ and Q′ signals are dependent on the color of the picture element being televised. In other words, the amount of luminance information carried by, for example, the single side-band portion of the I′ signal is not fixed by the high-frequency I′ transient but rather varies depending on the color through which the transient occurs. The amount of luminance carried by the Q′ signal also varies depending on the color. Also, as is indicated in the subcarrier signal diagram of Fig. 4 by the fact that the subcarrier luminance contours are elliptical, complete information regarding the single side-band luminance cannot be conveyed by transmitting only the I′ signal in a single side-band manner. In other words, the relative distribution of luminance information between the I′ and Q′ signals also varies depending on the image color. The constant coefficient of Equations 8 and 10 may also be expressed in terms of the receiver subcarrier signal channel gains and the relative luminosity to the human eye of the three primary colors R′, G′, and B′. In other words, these coefficients are determined by the receiver circuits gains and the gain factor of the human eye.

Figure 6:
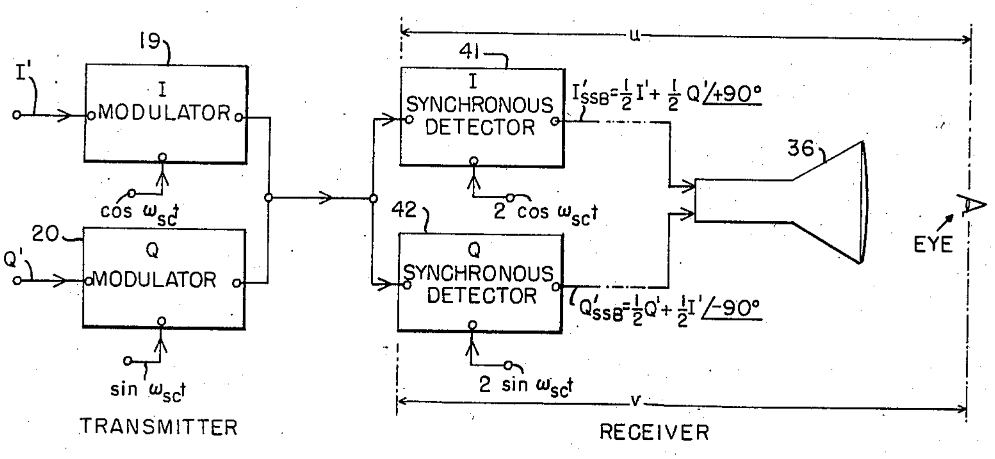
Fig. 6 is a simplified representation of the essential subcarrier signal circuits of the color-television receiver and transmitter and is useful in visualizing the operation of the present invention.

Referring now to Fig. 6 of the drawings, there is shown a simplified representation of the essential elements of both the transmitter and receiver color subcarrier channels. This condensed representation of the subcarrier signal circuits is used to more clearly illustrate the signal components involved in transmitting and receiving the single side-band portion of the subcarrier signal. Assuming that a video-signal component I′ lying in the single side-band region is supplied to the transmitter modulator 19 of Fig. 6 and that such signal component is encoded onto the subcarrier signal and subsequently transmitted in a single side-band manner, then, where it is the lower side band that is transmitted, such single side-band signal is detected by the synchronous detector 41 and also is detected by the synchronous detector 42. This I′ signal component at the output of the detector 42 represents undesired signal cross talk and differs in phase from the corresponding component at the output of the detector 41 by a factor of 90° which is due to the 90° difference in the phase of the local reference signals supplied to the two synchronous detectors. In a similar manner, a single side-band video-frequency component Q′ supplied to the modulator 20 produces a direct Q′ component at the output of the detector 42 and also produces a cross-talk component at the output of the detector 41. Thus, where the single side-band components are lower side-band components, the total single side-band components at the output of the I synchronous detector 41 may be denoted by the symbol $I'_{SSB}$ and described mathematically by the following expression:

$$I'_{SSB}=\frac{1}{2}I'+\frac{1}{2}Q'\underline{/+90^\circ} \qquad (11)$$

Similarly, the total single side-band components at the output of the Q synchronous detector 42 may be denoted by the symbol $Q'_{SSB}$ and described by the following expression:

$$Q'_{SSB}=\frac{1}{2}Q'+\frac{1}{2}I'\underline{/-90^\circ} \qquad (12)$$

The reason for the one-half amplitude factors in Equations 11 and 12 is due to the loss of one-half of the signal components which are inherent when signal are transmitted in a single side-band manner, in which case the other one-half of the signal components are in the omitted or suppressed side band which, in this case, is the upper side band. The local reference signals supplied to the detectors 41 and 42 are indicated as having an amplitude factor of two (2) because this serves to compensate for a further one-half amplitude signal loss which would otherwise occur due to the generation of the second harmonic terms by heterodyning in the detection process, which second harmonic terms are filtered out or suppressed by the output circuitry of the detectors.

In order to appreciate how the direct and cross-talk terms of Equations 11 and 12 contribute to the reproduced luminance seen by the human eye, it is necessary to weigh these terms in accordance with the luminance sensitivities of the channels through which the signal components are translated. This weighing of the detected components may be obtained by inserting the expressions of Equations 11 and 12 into the relationship of Equation 6 which results in the following expression:

$$(Y_{sc})_{SSB}=\frac{1}{2}(uI'+vI'\underline{/-90^\circ}+vQ'+uQ'\underline{/+90^\circ}) \qquad (13)$$

From this Equation 13 will be seen the reason why the cross-talk components, i.e., the terms bearing a 90° phase shift, cause objectionable variations in the reproduced luminance. In the first place, the amplitude of these cross-talk components is incorrect but even more serious is the fact that the timing or phase of these cross-talk components is incorrect. Such timing error means that luminance fluctuations will be reproduced in the picture with improper relative timing.

It is a purpose of the present invention to modify the transmitted single side-band components and, in this manner, to precorrect the amplitude and timing of the luminance cross-talk components for the specific receiver chosen, thereby to minimize the visibility of such cross-talk components. To this end, it may be shown mathematically that the desired modification may be obtained by transmitting a modified single side-band signal $I_0$ and a modified single side-band signal $O'_0$ which modified signals are given by the following equations:

$$I'_0 = I' + I'\underline{/2\lambda} \qquad (14)$$

$$Q'_0 = Q' - Q'\underline{/2\lambda} \qquad (15)$$

where $$\cos\lambda = \frac{u}{\sqrt{u^2+v^2}} \qquad (16a)$$

$$\sin\lambda = \frac{v}{\sqrt{u^2+v^2}} \qquad (16b)$$

It should be noted that these modified signals are expressed in terms of the transmitter video-frequency components $I'$ and $Q'$ prior to encoding onto the subcarriers at the transmiter. This indicates that the desired signal modification may be obtained by modifying the color-difference signals prior to the encoding of such signals onto the subcarriers. Also, these modified signals apply only to video components of the $I'$ and $Q'$ signals which fall within the single side-band region. From Equation 14 it will be seen that the modification required for the single side-band portion of the $I'$ signal is to transmit the normal $I'$ signal plus a phase-shifted replica thereof. By Equations 16*a* and 16*b* it is seen that the amount of phase shift depends on the luminance sensitivities $u$ and $v$ and, hence, on the color of the picture element being televised. In this manner, the encoding of the single side-band portion of the $I'$ signal is modified in accordance with the color of the picture element. Corresponding considerations apply to the modification of the single side-band portion of the $Q'$ signal indicated by Equation 15.

If the modified signals $I'_0$ and $Q'_0$ are supplied to the modulators 19 and 20 in place of the conventional signals $I'$ and $Q'$, then a larger number of single side-band terms will be obtained at the output of the synchronous detectors 41 and 42. These terms, weighed in accordance with the luminance sensitivity of the detector channel in which they appear, may be obtained by substituting the expressions for $I'_0$ and $Q'_0$ of Equations 14 and 15 for the terms $I'$ and $Q'$ in Equation 13. The results of this substitution are given by the following expression:

$$(Y_{sc})_{SSB} = \frac{1}{2}\Big(\overset{①}{uI'} + \overset{②}{vI'}\underline{/-90^\circ} + \overset{③}{uI'}\underline{/2\lambda} + \overset{④}{vI'}\underline{/2\lambda-90^\circ}\Big) + \frac{1}{2}\Big(\overset{⑤}{vQ'} + \overset{⑥}{uQ'}\underline{/+90^\circ} - \overset{⑦}{vQ'}\underline{/2\lambda} - \overset{⑧}{uQ'}\underline{/2\lambda+90^\circ}\Big) \qquad (17)$$

The terms have been numbered for sake of convenience.

This equation wil be seen to contain direct, cross-talk, λ-shifted direct, and λ-shifted cross-talk terms. These signal components have been arranged into sets as indicated by the two sets of parentheses in Equation 17, one set containing the $I'$ signal terms and the other set containing the $Q'$ signal terms. In order to show that these signal terms combine to minimize the visibility of the luminance cross talk, such terms have been plotted in the vector diagrams of Figs. 7*a* and 7*b*. Fig. 7*a* is a vector diagram for the single side-band $IL'$ components, as indicated by the terms within the first set of parentheses of Equation 17. Thus, term ① represents the in-phase $I'$ component at the output of detector 41 while term ② represents the $I'$ cross-talk component at the output of detector 42 which is shifted in phase by −90°. Terms ③ and ④ indicate the λ-shifted $I'$ components at the outputs of the detectors 41 and 42, respectively. As indicated in the vector diagram of Fig. 7*a*, the two λ-shifted components combine to produce a term represented by the vector A. This term represented by the vector A, in turn, combines with the $I'$ cross-talk term to produce a resultant term which corresponds in amplitude and phase to the direct $I'$ component represented by them ①. Thus, the net result of all of these $I'$ terms is to produce an in-phase $I'$ luminance component of twice the amplitude of the in-phase $I'$ component normally produced by the output of the I synchronous detector 41. This doubling of the $I'$ component amplitude serves to offset the one-half amplitude reduction due to single side-band transmission of the $I'$ signal. Similarly, by reference to the vector diagram of Fig. 7*b*, it is seen that the $Q'$ signal components combine to produce an in-phase double-amplitude $Q'$ luminance component. The fact that these resultant signals are "in phase" means that no phase or timing errors exist in the reproduced luminance. Thus, Equation 17 reduces to the following expression:

$$(Y_{sc})_{SSB} = uI' + vQ' \qquad (18)$$

This expression of Equation 18 is identical to that of Equation 6 except that no cross-talk terms are included. The expression of Equation 18, of course, is the expression which describes correct reproduction of the luminance contributed by the single sideband portion of the subcarrier signal. This result was obtained by transmitting the modified single side-band $I'$ and $Q'$ signals indicated by the expressions of Equations 14 and 15. As a result, the reproduced luminance of the color image is correct over the single side-band frequency range of 0.5 to 1.5 megacycles as well as over the original double side-band frequency range from 0 to 0.5 megacycle. Thus, the frequency range for correct reproduction of the luminance information has been tripled. This, of course, results in a considerable improvement of resolution in the reproduced image.

*Transmitter apparatus of Fig. 8*

Referring now to Fig. 8 of the drawings, there is shown one possible form of subcarrier channel circuitry which may be used for the color subcarrier channel 16 of Fig. 1. The circuitry of Fig. 8 applies the subcarrier modification after the $I'$ and $Q'$ color-difference signals have been encoded onto their respective ones of the quadrature-phased subcarriers by the modulators 19 and 20. In order to describe the required modification after subcarrier encoding, it is necessary to obtain a mathematical expression for the encoded subcarrier signals when such signals have the correct modification. To this end, it is useful to assume momentarily that the signals supplied to the modulators 19 and 20 are the properly modified subcarrier components $I_0'$ and $Q_0'$. For convenience in deriving the expressions for the desired encoded subcarriers, the modified single side-band signals $I_0'$ and $Q_0'$ prior to being encoded may be expressed as sinusoidal components as follows:

$$I_0' = I'\cos\omega t + I'\cos(\omega t + 2\lambda) \qquad (19)$$

$$Q_0' = Q'\cos\omega t + Q'\cos(\omega t + 2\lambda) \qquad (20)$$

Actually, the color-difference signals prior to encoding may comprise many frequency components but, because these components combine in an additive manner, the results obtained for a single component also apply to the other components.

These subcarrier components $I_0'$ and $Q_0'$ are heterodyned with the corresponding subcarrier signals supplied to the respective modulators 19 and 20 to produce the usual sum-frequency and difference-frequency heterodyne components. In the present case, we are only interested in difference-frequency components which may be described mathematically by the following expression:

$$(E_{sc})_0=\frac{1}{2}\overset{①}{I'}\cos(\omega_{sc}t-\omega t)+\frac{1}{2}\overset{②}{Q'}\sin(\omega_{sc}t-\omega t)$$

$$+\frac{1}{2}\overset{③}{I'}\cos(\omega_{sc}t-\omega t-2\lambda)-\frac{1}{2}\overset{④}{Q'}\sin(\omega_{sc}t-\omega t-2\lambda) \quad (21)$$

where $\omega_{sc}=2\pi(3.58 \text{ mc.})$=subcarrier angular velocity
$\omega$=video-signal angular velocity
$t$=time The signal of Equation 21 represents the desired single side-band portion of the composite output signal $(E_{sc})_0$ at the output of the adding circuit 23. A study of Equation 21 reveals that terms ① and ② thereof represent the normal lower side-band single side-band portion of the subcarrier signal, provided a portion of the Q' signal is transmitted in a single side-band manner, while the additional terms ③ and ④ represent the λ-shifted lower side-band components resulting from the λ-shifted video components supplied to the modulators 19 and 20.

In order to produce the desired modification of the subcarrier signals, it is necessary to develop signal components represented by the third and fourth terms of Equation 21 and then to add these terms in with the original subcarrier components in an amount depending upon the value of correction which is desired. To this end, the encoded subcarrier signals $I_{sc}'$ and $Q_{sc}'$ at the outputs of the modulators 19 and 20 are supplied to an adding circuit 70 wherein they are combined to produce the conventional composite subcarrier signal $E_{sc}$. This signal is then supplied to a filter 71 which is effective to pass only the narrow band double side-band (DSB) portion of the composite subcarrier. This double side-band portion $(E_{sc})_{DSB}$ may be represented by the following expression:

$$(E_{sc})_{DSB}=I'\cos\omega_{sc}t+Q'\sin\omega_{sc}t \quad (22)$$

This double side-band portion of the subcarrier signal as described by Equation 22 is then supplied to a subcarrier modifier 72 which serves to produce a so-called λ subcarrier, that is, a subcarrier signal containing the desired phase-shift factor λ. The subcarrier modifier 72 may be of the type described in an article entitled "Processing of the NTSC Color Signal for One-Gun Sequential Color Displays," by B. D. Loughlin, and appearing at pages 299–308, inclusive, of the January 1954 issue of the Proceedings of the I.R.E. Also supplied to such signal modifier 72 is a second harmonic subcarrier reference signal which is supplied by way of a terminal 72*a* which may be coupled to the subcarrier signal generator 21 of Fig. 1. As mentioned in the Loughlin article, a subcarrier modifier of the type therein described serves to modify the subcarrier signal supplied thereto so that the phase and amplitude variations thereof are reproportioned to produce a resultant which corresponds to the original subcarrier except that the mixture of red, green, and blue color signals making up the modulation components is modified. In other words, the subcarrier modifier performs a matrixing operation where the matrixing is performed on the encoded subcarrier instead of the color-difference video signals. A single subcarrier modifier of the form shown in the Loughlin article, however, can provide only part of the desired modification. Hence, two such operations should be provided and the modifier 72 of Fig. 8 may include two such circuits. The resulting λ subcarrier $E_\lambda$ may be described by the following expression:

$$E_\lambda=\overset{①}{u\cos\omega_{sc}t}+\overset{②}{v\sin\omega_{sc}t}=\overset{③}{\sqrt{u^2+v^2}}\cos(\omega_{sc}t-\lambda) \quad (23)$$

It will be noted that terms ① and ② of Equation 23 are like the corresponding terms of Equation 22 except that I' is replaced by $u$ and Q' is replaced by $v$.

The λ-shifted subcarrier from the modifier 72 is then supplied by way of a frequency doubler 73 and an amplitude-modulation rejector 74 to a modulator 75. Each of these units may be of conventional construction. The amplitude-modulation rejector 74 may, for example, take the form of an amplitude limiter for suppressing the amplitude variations represented by the coefficients of term ③ of Equation 23. In this manner, there is produced at the output of the rejector 74 a second harmonic λ subcarrier containing the phase-shift factor 2λ. This signal may be represented by the following expression:

$$E_\lambda=2\cos(2\varpi_{sc}t-2\lambda) \quad (24)$$

Also supplied to the modulator 75 is the upper single side-band (USB) portion of the composite subcarrier signal $E_{sc}$ developed by the adding circuit 70. This upper side-band single side-band portion is selected by means of the upper side-band filter 76. This upper side-band signal may be represented mathematically by the expression:

$$(E_{sc})_{USB}=\tfrac{1}{2}I'\cos(\omega_{sc}t+\omega t)+\tfrac{1}{2}Q'\sin(\omega_{sc}t+\omega t) \quad (25)$$

which represents the sum-frequency heterodyne components produced at the output terminals of the modulators 19 and 20. The modulator 75 serves to heterodyne this upper side-band subcarrier signal with the second harmonic λ subcarrier supplied by the rejector 74 to produce the usual sum-frequency and difference-frequency heterodyne components. A filter 77 serves to pass only the difference-frequency components which may be denoted by the symbol $E_a$ and described by the following expression:

$$E_a=\tfrac{1}{2}I'\cos(\omega_{sc}t-\omega t-2\lambda)-\tfrac{1}{2}Q'\sin(\omega_{sc}t-\omega t-2\lambda) \quad (26)$$

It will be noted that this signal $E_a$ is identical with the desired modified subcarrier components represented by terms ③ and ④ of Equation 21. Thus, this signal $E_a$ contains the desired additional components for modifying the conventional subcarrier signal.

It should be remembered, at this point, that only the luminance aspect of the reproduced image has been corrected over the single side-band region. This is because the phase-shift factor λ and, hence, the luminance sensitivities $u$ and $v$ were defined in terms of the reproduced luminance. As a result, the modification for correct luminance reproduction serves to alter the reproduction of the other color information in an adverse manner. Accordingly, the luminance correction should be used only on a regional basis. Referring now to the subcarrier signal diagram of Fig. 9, the various color areas thereof have been roughly divided into three regions. A consideration of these regions will help one to visualize the nature of modification required of the single side-band portion of the subcarrier signal in order to get the optimum amount of information therefrom where the present-practice type of luminance signal is transmitted. As mentioned in connection with the Fig. 4 diagram, the subcarrier luminance $Y_{sc}$ increases as the square of the amplitude of the subcarrier and, hence, increases rapidly as the saturation of the reproduced color increases. Accordingly, the loss of information varies in the same manner. With reference to Fig. 9, the largest amount of luminance information is carried for the more highly saturated colors which are represented by Region No. 3 of the diagram of Fig. 9. Hence, in this region it appears to be desirable that the reproduced luminance be correct. On the other hand, for colors near white, that is, the origin or center of the subcarrier signal diagram, very little luminance information is carried by the subcarrier. Accordingly, in this region, indicated as Region No. 1 on the Fig. 9 diagram, it is preferable that some other color information, such as perhaps I′ signal information, be transmitted in such a manner as to produce the corresponding high-frequency color differences correctly. This means that for this Region No. 1 the present general type of encoding of the single side-band portion of the subcarrier may be adequate. For the intermediate Region No. 2, a compromise must be made between correct color information and correct luminance information so that as the subcarrier luminance information becomes more noticeable to the human eye the correction signal becomes more nearly that required to produce correct luminance.

To achieve this preferred regional modification of the single side-band portion of the subcarrier signal, it is desired that when colors of low saturation are being reproduced the single side-band portion of the subcarrier signal be in accordance with the practice presently adopted by the Federal Communications Commission. To this end, the single side-band portion of the Q′ signal, which is to be suppressed according to the presently adopted standards, should only be transmitted when full correction of the luminance reproduction is desired. Accordingly, the filter 22 in the Fig. 8 circuit serves to supply only the conventional double side-band portion of the Q′ signal to the adding circuit 23. The additional single side-band portion of the Q′ signal is supplied by the filter 50 to the adding circuit 51, which may be of conventional construction like the adding circuit 23. Also supplied to the adding circuit 51 is the signal $E_a$ containing the modified subcarrier components. The components at the output of adding circuit 51 are, in turn, supplied by way of a gain-control circuit 52 and then combined with the conventional signal components by the adding circuit 23. The gain-control circuit 52 serves to control the degree of modification in accordance with the saturation of the particular color being televised.

As previously mentioned, the single side-band correction of the luminance information includes a boost or gain of two for the single side-band signal components. In other words, full amplitude luminance variations will normally be produced by the modified subcarrier components. This is desirable in that the receiver need no longer include provisions for obtaining this gain of two. Other advantages also occur in that certain other types of distortion are minimized. As mentioned, when the conventional I′ signal is transmitted in a single side-band manner, a one-half amplitude loss in the I′ signal amplitude normally occurs. Accordingly, for Region No. 1 of Fig. 9 where the unmodified conventional I′ signal is transmitted, it is desirable to provide a gain of two at the transmitter for the single side-band portion of the conventional I′ signal. A multiplication of the single side-band portion of the conventional I′ signal by two may be provided by the amplifier 80 after such single side-band signal has been separated from the wide band I′ subcarrier by a filter 81. Other methods of obtaining the gain of two are well known in the art. The resulting full amplitude single side-band I′ component from the amplifier 80 is supplied to the adding circuit 23. When the full value of subcarrier modification is being applied to the single side-band signal (Region No. 3), it is necessary that the single side-band I′ signal portion supplied by amplifier 80 to adding circuit 23 have only a half amplitude value, as indicated by the expression of Equation 21, because in this case the additional single side-band components $E_a$ produce the desired gain of two. In order to obtain this result, the half amplitude single side-band I′ component at the output of the filter 81 is supplied to a phase inverter 82 which serves to invert the polarity of this signal and thereby make it negative in sign. This negative half amplitude I′ component is then supplied to the adding circuit 51 and then by way of the gain-control circuit 52 to the adding circuit 23 wherein it subtracts from the full amplitude I′ component from amplifier 80 to produce a resultant half amplitude I′ component.

In order to visualize the result of combining these signal components in the adding circuit 23, the resultant signal for these single side-band components may be described by the following expression:

$$(E_{sc})_0=\frac{1}{2}\overset{①}{(I'_{sc})_{SSB}}+m\Delta\left[-\frac{1}{2}\overset{②}{(I'_{sc})_{SSB}}+\frac{1}{2}\overset{③}{(Q'_{sc})_{SSB}}+\overset{④}{E_a}\right] \quad (27)$$

The terms within the brackets of Equation 27 represent the sum of the signals supplied to the adding circuit 51. The factor $m\Delta$, with which the bracketed term is multiplied, represents the gain factor of the gain-control circuit 52 which is a function of the saturation of the image element being televised. All of these components from the gain-control circuit 52 are, in turn, combined with the full amplitude I′ signal component, represented by term ① of Equation 27, in the adding circuit 23 thereby to produce the composite output signal $(E_{sc})_0$ for the single side-band components. A consideration of Equation 27 with respect to the idea that the degree of modification of the subcarrier is to be controlled in accordance with the color saturation or, in other words, the amplitude of the subcarrier signal, shows that for the case of low-saturation colors (Region No. 1), which correspond to the situation where only a minor amount of luminance information is being carried by the subcarrier signal, the gain factor $m\Delta$ of Equation 27 is made to be zero and the single side-band portion of the composite subcarrier is described by term ① of Equation 27 and, hence, is a full amplitude single side-band I′ signal component. On the other hand, where a highly saturated color is being transmitted (Region No. 3), the gain-control factor $m\Delta$ is made to be unity in which case the expression of Equation 27 for the single side-band components reduces to that of Equation 21 which, as previously explained, described the properly modified subcarrier for producing correct luminance at the receiver. In brief, the correction signal to be added to the single side-band component $(I'_{sc})$ consists of two parts: a first part derived from the $I'_{sc}$ single side-band information and corrected in amplitude and phase in accordance with the large area color, and a second part derived from the $Q'_{sc}$ single side-band information and also corrected in amplitude and phase in accordance with the large area color. The sum of the two parts is modulated or multiplied by the factor $m\Delta$ so as to approach zero at low saturations and to approach full amplitude at maximum saturation. It will be noted that the fact that the gain of two or amplitude doubling of the single side-band portion of the subcarrier is provided by the transmitter means that such gain of two need no longer be supplied by the receiver and, hence, results in a simplification thereof.

The gain-control circuit 52 may take the form of any of the well-known types of amplitude modulators of variable-gain amplifiers. For example, such circuit may take the form of the gain-control circuit shown in Fig. 2 of an article "Practical Volume Expansion" by C. M. Sinnett appearing in Electronics magazine, November 1935, page 429, and comprising the "variable-gain voltage amplifier" tube 6L7 having a gain-control voltage derived from the detector tube 6C5 and applied to its No. 3 grid and having the signal to be controlled applied to its No. 1 grid. The wide band (0–1.5 magacycles) composite subcarrier may be supplied to the subcarrier modifier 85 and the detected components later be band-width limited by a filter 87 to pass only the low-frequency double side-band components. The filter 87 may be a conventional low-pass filter, such as that shown in Figure 54(*a*) at page 422 of "Radio Engineers' Handbook" by Frederick E. Terman, McGraw-Hill Book Company, 1943. In this way, distortion resulting from the nonlinear nature of the composite subcarrier signal $E_{sc}$ is minimized.

The gain-control signal $\Delta$ represents, roughly speaking, the amplitude of the composite subcarrier signal for the double side-band low-frequency portion thereof. The factor "$m$" represents a proportionality constant. As shown in Fig. 8, this control signal may be developed by utilizing the subcarrier modifier 85 and an envelope detector 86. The subcarrier modifier 85 may be similar in construction to the subcarrier modifier described in the aforesaid Loughlin article. Supplied to this subcarrier modifier 85 is the composite subcarrier signal $E_{sc}$ present at the output of the adding circuit 70 while the signal $\cos 2\omega_{sc}t$ is supplied from terminal **72*a* to a control electrode of the tube of unit 85 to serve as a heterodyne reference signal. The subcarrier modifier 85 serves to change the form of the composite subcarrier from a so-called "elliptical" subcarrier to a so-called "circular" subcarrier. These geometrical terms are derived from the corresponding nature of the subcarrier luminance contours of the subcarrier signal diagram of Fig. 4. In other words, an elliptical subcarrier, which is the conventional subcarrier, means that the luminance contours are elliptical in nature as shown in Fig. 4 and, hence, that the luminance carried by the subcarrier depends on the phase angle of the subcarrier. For the case of a circular subcarrier, however, the luminance contours are circular and, hence, the amount of luminance information carried by the subcarrier does not depend on the phase angle thereof. In this manner, when the subcarrier is converted to a "circular" subcarrier, then the amplitude of the subcarrier which is supplied to the detector 86** does not vary with the phase angle of the subcarrier and, hence, the control signal $\Delta$ depends only on the saturation of the picture element being televised.

As shown in Equation 27, the degree of modification of the subcarrier is controlled in accordance with the control signal $m\Delta$. For optimum control of the degree of modification, however, it may be preferable to control such modification in accordance with some other function of the control signal $\Delta$, the precise function being best determined experimentally in order to take into account the subjective effects within the human eye. The following units of the apparatus of Fig. 8 may make up the correction-signal generator 26 of Fig. 1: filter 81, amplifier 80 (with unity gain), filter 71, adding circuit 70, filter 76, phase inverter 82, filter 50, subcarrier modifier 72, frequency doubler 73, amplitude-modulation rejector 74, modulator 75, filter 77, adding circuit 51, gain-control circuit 52, subcarrier modifier 85, envelope detector 86, and filter 87.

*Transmitter apparatus of Fig. 10*

Referring now to Fig. 10 of the drawings, there is shown an alternative way of forming the $\lambda$ subcarrier which, in the Fig. 8 circuit, was formed by the subcarrier modifier 72. As shown in Fig. 10, a U matrix 90 is utilized to matrix the gamma-corrected red, green, and blue color signals supplied thereto in accordance with the expression of Equation 8 to produce the $u$ control signal. Similarly, a V matrix 91 is utilized to matrix the red, green, and blue color signals supplied thereto in accordance with the expression of Equation 10 to produce the $v$ control signal. These $u$ and $v$ signals are encoded onto a pair of quadrature-phased subcarriers by way of the respective modulators 93 and 94 thus producing output signal components which correspond to the first and second terms of Equation 23 which, as mentioned in connection with Equation 23, combine to produce the desired $\lambda$ subcarrier $E_{\lambda}$. These signals are combined by the adding circuit 95. This alternative way of forming the $\lambda$ subcarrier may be used in place of the subcarrier modifier 72 of Fig. 8. Instead of matrixing the red, green, and blue color signals, the U matrix 90 and V matrix 91 may be connected to receive the I′ and Q′ color-difference signals and then matrix these signals in accordance with Equations 7 and 9.

*Conclusion*

From the foregoing descriptions of the various embodiments of the invention it will be apparent that a color-television system constructed in accordance with the present invention utilizes signal-controlled or variable encoding of the signal side-band portion of the subcarrier signal to control the information content of such single side-band portion so that the information conveyed thereby is more nearly the optimum information with respect to the characteristics of the human eye. If, contrary to present practice, a monochrome signal is transmitted which conveys all of the luminance information, then the encoding of the single side-band portion of the subcarrier may be controlled to more efficiently translate other colorimetric dimensions than luminance. Preferably, in this case, the single side-band portion would be modified to correctly convey as nearly as possible the colorimetric information corresponding to the local wide band axes of the human eye at all colors. If, however, the present-practice monochrome signal is transmitted, then the encoding of the single side-band portion is controlled to obtain optimum luminance of the reproduced color image for the more saturated colors. In either event, the use of signal-controlled encoding together with the use of a receiver which has no blind axes for some colorimetric components serves to minimize the subjective loss of resolution in the reproduced color image. At the same time, the use of wide band color-difference channels which are of equal band width serves to considerably minimize the expense and complexity of the receiver.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for transmitting a color-television signal including component signals representative of three characteristics of the color image being televised while minimizing subjective loss of resolution in the reproduced color image at a receiver, comprising: circuit means responsive to the component signals for generating a monochrome signal which conveys brightness and resolution information; circuit means responsive to the low-frequency components of the component signals for generating a double side-band portion of a subcarrier signal for determining large area image color; circuit means responsive to both the low-frequency and high-frequency components of the component signals for generating a single side-band portion of the subcarrier signal circuit means for developing a correction signal derived from said single side-band components and varying with the large area color; and circuit means for combining said double side-band and said single side-band subcarrier signals and said correction signal for transmission, whereby the luminance components of said modulated subcarrier signals contribute usefully to the resolution of the reproduced image.

2. A system for transmitting a color-television signal including component signals representative of three characteristics of the color image being televised while minimizing subjective loss of resolution in the reproduced color image at a receiver, comprising: circuit means responsive to the component signals for generating a monochrome signal which conveys brightness and resolution information; matrixing circuit means responsive to said component signals for developing a pair of color-difference signals; modulator and filtering circuit means responsive to said color-difference signals for developing a subcarrier signal having double side-band modulation components determined by the low-frequency components of said color-difference signals and having single side-band modulation components determined by the high-frequency components of one of the color-difference signals; circuit means for developing additional single side-band subcarrier components determined by the high-frequency components of the other color-difference signal; circuit means for developing a correction signal derived from said single side-band components and varying with the large area color; and circuit means for combining said double side-band and said single side-band subcarrier signals and said correction signal for transmission, whereby the luminance components of said modulated subcarrier signals contribute usefully to the resolution of the reproduced image.

3. A system for transmitting a color-television signal including component signals representative of three characteristics of the color image being televised while minimizing subjective loss of resolution in the reproduced color image at a receiver, comprising: circuit means responsive to the component signals for generating a monochrome signal which conveys brightness and resolution information; matrixing circuit means responsive to said component signals for developing I and Q color-difference signals; modulator and filtering circuit means responsive to said I and Q color-difference signals for developing a subcarrier signal having double side-band modulation components determined by the low-frequency components of said I and Q color-difference signals and having single side-band modulation components determined by the high-frequency components of said I color-difference signal; circuit means for developing additional single side-band subcarrier components determined by the high-frequency components of said Q color-difference signal; circuit means for developing a correction signal derived from said single side-band components and varying with the large area color; and circuit means for combining said double side-band and said single side-band subcarrier signals and said correction signal for transmission, whereby the luminance components of said modulated subcarrier signals contribute usefully to the resolution of the reproduced image.

4. A system for transmitting a color-television signal including component signals representative of three characteristics of the color image being televised while minimizing subjective loss of resolution in the reproduced color image at a receiver, comprising: circuit means responsive to the component signals for generating a monochrome signal which conveys brightness and resolution information; circuit means responsive to the low-frequency components of the component signals for generating a double side-band portion of a subcarrier signal for determining large area image color; circuit means responsive to both the low-frequency and high-frequency components of the component signals for generating a single side-band portion of the subcarrier signal; circuit means for deriving from said low-frequency components a control signal representative of local large area color of the image; circuit means responsive to said control signal for developing a correction signal derived from said single side-band components and varying with the large area color; and circuit means for combining said double side-band and said single side-band subcarrier signals and said correction signal for transmission, whereby the luminance components of said modulated subcarrier signals contribute usefully to the resolution of the reproduced image.

5. A system for transmitting a color-television signal including component signals representative of three characteristics of the color image being televised while minimizing subjective loss of resolution in the reproduced color image at a receiver, comprising: circuit means responsive to the component signals for generating a monochrome signal which conveys brightness and resolution information; circuit means responsive to the low-frequency components of the component signals for generating a double side-band portion of a subcarrier signal for determining large area image color; circuit means responsive to both the low-frequency and high-frequency components of the component signals for generating a single side-band portion of the subcarrier signal; circuit means for deriving from said low-frequency components a control signal representative of the luminance component of the local large area color of the image; circuit means responsive to said control signal for developing a correction signal derived from said single side-band components and varying with the large area color; and circuit means for combining said double side-band and said single side-band subcarrier signals and said correction signal for transmission, whereby the luminance components of said modulated subcarrier signals contribute usefully to the resolution of the reproduced image.

6. A system for transmitting a color-television signal including component signals representative of three characteristics of the color image being televised while minimizing subjective loss of resolution in the reproduced color image at a receiver, comprising: circuit means responsive to the component signals for generating a monochrome signal which conveys brightness and resolution information; circuit means responsive to the low-frequency components of the component signals for generating a double side-band portion of a subcarrier signal for determining large area image color; circuit means responsive to both the low-frequency and high-frequency components of the component signals for generating a single side-band portion of the subcarrier signal; circuit means for deriving from said low-frequency components a control signal representative of local large area color of the image; circuit means for developing additional subcarrier single side-band components representative of the high-frequency components of said characteristic signals; circuit means responsive to said control signal for varying the amplitude of said additional single side-band components in accordance with the large area color; and circuit means for combining said double side-band and said single side-band subcarrier signals and said additional single side-band components for transmission, whereby the luminance components of said modulated subcarrier signals contribute usefully to the resolution of the reproduced image.

References Cited in the file of this patent

UNITED STATES PATENTS

| | | |
|---|---|---|
| 2,725,422 | Stark et al. | Nov. 29, 1955 |
| 2,729,697 | Chatten | Jan. 3, 1956 |
| 2,773,116 | Chatten | Dec. 4, 1956 |